United States Patent [19]

Burdess

[11] Patent Number: 4,655,081

[45] Date of Patent: Apr. 7, 1987

[54] GYROSCOPIC DEVICES

[75] Inventor: James S. Burdess, Whitley Bay, England

[73] Assignee: National Research Development Corporation, London, England

[21] Appl. No.: 703,538

[22] Filed: Feb. 20, 1985

[30] Foreign Application Priority Data

Feb. 22, 1984 [GB] United Kingdom ............... 8404668

[51] Int. Cl.[4] ............................................... G01P 9/04
[52] U.S. Cl. ........................................ 73/505; 310/329; 310/369
[58] Field of Search ................. 73/505; 310/329, 366, 310/369

[56] References Cited

U.S. PATENT DOCUMENTS

| 2,683,247 | 7/1954 | Wiley. | |
|---|---|---|---|
| 3,182,512 | 5/1965 | Jones et al. | 73/505 |
| 3,408,872 | 11/1968 | Simmons et al. | 73/505 |
| 3,648,512 | 3/1972 | Abbotts | 73/32 A |
| 4,079,630 | 3/1978 | Friedland et al. | |
| 4,489,609 | 12/1984 | Burdess et al. | 73/505 |

FOREIGN PATENT DOCUMENTS

| 0141621 | 5/1985 | European Pat. Off. . |
|---|---|---|
| WO81/00933 | 4/1981 | PCT Int'l Appl. . |
| 1288118 | 9/1972 | United Kingdom . |
| 2021266 | 11/1979 | United Kingdom . |
| 2061502 | 5/1981 | United Kingdom . |
| 2113842 | 8/1983 | United Kingdom . |

OTHER PUBLICATIONS

"The Vibrating Cylinder Gyro", Langdon, 1982, *Marconi Review*, 231-249.
*Machine Design*, "Solid-State Gyro 'Dances the Twist'", 1962, p. 12.

Primary Examiner—Michael J. Tokar
Assistant Examiner—John E. Chapman, Jr.
Attorney, Agent, or Firm—Cushman, Darby & Cushman

[57] ABSTRACT

A gyroscopic device comprising a resonator in the form of a disc, cylinder or like structure of circular outline, of a composition containing piezo-electric material and preferably made of a an integral mass of such material. The resonator is excited into dilatation-type vibration by electric currents applied to exciting electrodes electro-deposited in a regular pattern around the circumference of the structure, and these vibrations are sensed by detecting electrodes similarly deposited around the wall in a similar but angularly displaced pattern. A measure of any rate of turn which the structure is undergoing about its axis can be derived from the resulting phase shift of the electrical output from the detecting electrodes.

9 Claims, 11 Drawing Figures

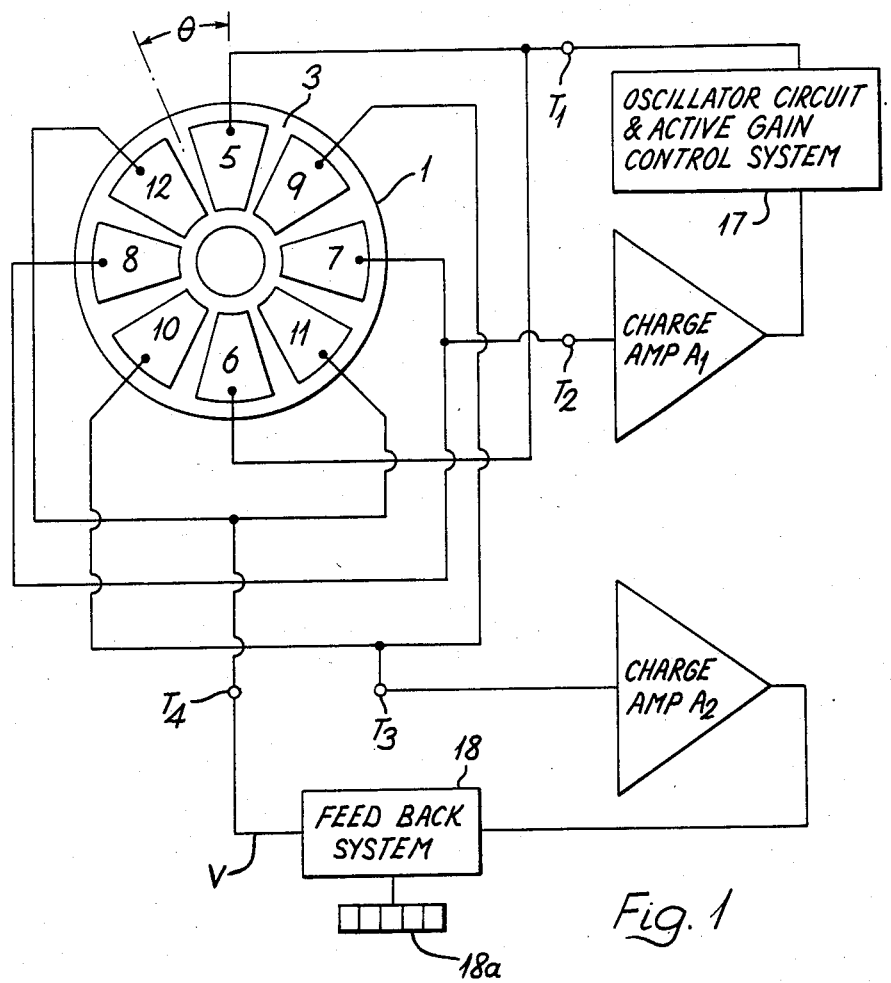
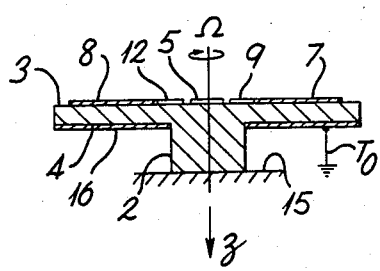

GYROSCOPIC DEVICES

This invention relates to gyroscopic devices.

BACKGROUND OF THE INVENTION

There is an increasing demand for rate gyroscopes—that is to say, gyroscopes that may be used to sense rates of turn—that contain the minimum of moving parts and are therefore potentially simpler, cheaper and more robust than the traditional rate gyroscopes that use rotors and gimbal-type suspensions. An increasing number of rate gyroscope designs have recently made use of the piezo-electric effect in order to cut down the number of moving parts and to do away with rotors. For example, published UK Patent Application No. GB 2111209A, which formed the priority basis for U.S. Pat. No. 4,489,609, describes three designs of one known type of gyroscope making use of this effect. In one of these, the piezo-electric effect is used to excite a long beam, held at both ends of its axis Ox, to deflect in one of the planes (the Oxy plane) including that axis: when the beam is subjected to a rate of turn about Ox, the vibration in the Oxy plane gives rise, by reason of the Coriolis, effect to inertia forces that cause it to vibrate in the Oxz plane, and these vibrations are sensed to give a measure of the rate of turn. In the second example, a mushroom-shaped structure comprising a stem and surmounting head formed about axis Oz is excited into a mode of resonant vibration in which the head expands and contracts radially, that is to say in the Oxy plane: when the device is subjected to a rate of turn about Oz, the Coriolis effect results in resonant torsional vibrations of the stem about Oz from which a measure of the applied rate may again be derived. In the third example, the sensitive structure is a rectangular plate arranged so that its edges lie parallel to the axes Ox and Oz, and its thickness dimension parallel to Oy: the plate is located by supports attached to the opposite edges that lie parallel to Oz, and is excited so as to execute resonant vibrations in a direction parallel to Oz, and when the plate is subjected to a rate of turn about Oy the Coriolis effect tends to generate vibrations parallel to Ox, giving rise, because of the piezo-electric effect, to signals from which a measure of the applied rate of turn may once again be derived.

While all three of the constructions just described have the advantage that they lack conventional moving parts, so that the movements essential to the gyroscopic effect are only vibratory movements of anchored structures, nevertheless in each case the vibrations that need to be sensed in order to indicate the applied rate of turn are significantly different from those into which the structure is originally excited. For instance they are directed along a different axis, or are generated in a different part of the total structure.

UK Specification No. GB 2061502A shows an example of another known type of gyroscope which makes use of the piezo-electric effect. The gyroscope described in that specification comprises an accurately-machined cup-shaped resonator make of some ordinary and suitably robust material, to the wall of which excitation and detection piezo-electric vibration transducers are bonded. An input current to the excitation transducers produces a mechanical output which in turn sets the resonator into vibration, and the variation of that vibration due to an applied rate of turn is sensed by the detection transducers and provides an indication of the magnitude of that rate of turn.

Not only do the meeting faces of such resonators and piezo-electric transducers have to be of accurately-matching shape in order for it to be possible to make a satisfactory bond between them, but also the complex of vibrations which such a resonator undergoes in use subjects the bonds to great strain. While the failure of a bond of course results in the failure of the whole instrument, mere deterioration of a bond short of total failure will result in inaccuracy of the gyroscope which may not at once be apparent.

SUMMARY OF THE INVENTION

The present invention arises in general from appreciating the possibility of a different principle of construction of piezo-electric gyroscopes according to which the transformation from electrical input to mechanical output, characteristic of the piezo-electric effect, takes place within the resonator itself because the resonator consists of piezo-electric material or at least contains it in a form that does not require vibration-sensitive bonds between such material and any others that may be present.

According to the invention a gyroscopic device comprises an axisymmetrically-anchored structure of circular shape and of a composition in which material exhibiting the piezo-electric effect is included without vibration-sensitive bonds, first electrodes mounted axisymmetrically on the structure and adapted by co-operation with the piezo-electric effect to generate within it a pattern of strain that varies cyclically around the structure in a circumferential direction, second electrodes mounted on the same structure axisymmetrically but at locations angularly-spaced relative to those of the first electrodes and adapted to emit electrical signals generated by the interaction of the pattern of strain and the piezo-electric effect whereby an angular displacement of the cyclical strain variation caused by an applied rate of turn about the axis of the structure results in a change in the signal emitted by the second electrodes, and means to derive a measure of the applied rate of turn by reference to such change of signal. Preferably the structure is a unitary (integral) mass of material exhibiting the piezo-electric effect and the second electrodes are mounted at locations coinciding, in the absence of any said applied rate of turn, with nodes of the cyclical strain pattern generated by the first electrodes.

The structure may be a circular disc, the first and second electrodes being mounted together on one of the faces of the disc. Alternatively the structure may be a hollow cylinder and the first and second electrodes may be mounted together on the inner or the outer wall, preferably the latter, of the cylinder.

A disc-like structure may be anchored to ground by means of a support connected to the disc at its axis or at its periphery. Ground may lie to one side of the structure only, so that only a single anchoring means is required to attach the structure to that ground. Alternatively, ground may lie to both sides of the circular structure axially, and separate supports extending away from the structure in opposite axial directions anchor the structure to both of these grounds.

Circular structures like the disc and cylinder already described may be made of sheet-form or laminar material exhibiting the piezo-electric effect, first and second electrodes being disposed on one face of the disc, cylinder or other sheet-form structure while the opposite and parallel face is grounded.

The electrodes may be mounted on the structure by electro-deposition.

BRIEF DESCRIPTION OF THE DRAWINGS

The invention will now be described, by way of example, with reference to the accompanying diagrammatic drawings in which FIG. 1 shows a disc-type structure in plan, and associated electrical components schematically;

FIG. 2 shows the disc of FIG. 1 in elevation;

DETAILED DESCRIPTION OF THE PREFERRED EMBODIMENT

Figure 3:
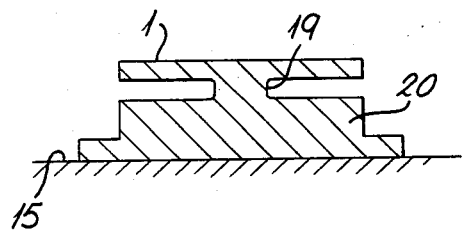
FIGS. 3 to 5 show alternative discs in axial section.

FIG. 1 shows a thin disc 1 made of piezo-electric material—for instance an XY slice of lithium niobate or an axially-polarized slice of lead zirconate titanate (PZT)-supported at the axis by one end of a stem 2 the other end of which is anchored to fixed structure 15. Deposited on the top surface 3 of disc 1 by electro-deposition techniques are eight identical equispaced electrodes 5–12. Electro-deposition techniques automatically ensure the most accurate possible compliance between the deposited electrode and the surface of the structure on which it is deposited, without the costly machining necessary when, as in the prior art, the item that is to be bonded to the structure is a preformed piezo-electric transducer which must be shaped to fit. A single electrode 16 is deposited on the lower surface 4 of the disc: it covers the entire area of that surface, and is held at ground potential by way of terminal $T_0$. The electrodes on top surface 3 are electrically connected in pairs—5 with 6, 7 with 8, 9 with 10 and 11 with 12—to form terminals $T_1$, $T_2$, $T_3$ and $T_4$.

An AC voltage applied to terminal $T_1$ from a power source contained within unit 17, which also contains an oscillator circuit with active gain control, will now produce an axial (Oz) electrical field which is confined to the opposite sectors of disc 1 in which electrodes 5 and 6 are deposited. Since the disc material is piezoelectric this field excites the disc into a mode of oscillation in which its shape, when viewed in plan, changes repeatedly between a first ellipse concentric with the original circle, and a second ellipse similar in shape and also concentric but with its major axis lying at right angles to that of the first ellipse. This mode of oscillation results from a volumetric strain (dilatation) $e_1$ which varies around the circumference of the disc according to an expression of the form $e_1 = e_{01}(t) \cos 2\theta$. By using the reciprocal piezo-electric effect, a measurement of the rate of change of $e_{01}(t)$ with respect to time ($\dot{e}_{01}$) can be made by recording the voltage generated at the output of amplifier $A_1$ to which terminal $T_2$ is connected.

If the voltage supplied at terminal $T_1$ is now arranged to depend upon the voltage generated by $A_1$, it is well known that disc 1 may be driven as an oscillator in such a manner that $e_{01}$ can be made to vary sinusoidally with time at a frequency corresponding to the natural resonant frequency of the disc, the amplitude of $e_{01}$ being held at a preset value by use of the active gain control of unit 17.

Terminal $T_3$ is also connected to a charge amplifier $A_2$, which is similar to $A_1$, and in the absence of any rate of turn about axis Oz the voltage output of amplifier $A_2$ due to $e_1$ is zero. This is because of the way the dilatation $e_1$ varies with the co-ordinate $\theta$ according to the formula relating $e_1$ and $e_{01}$ already given, and the positioning of electrodes 9 and 10 relative to electrodes 5,6 and 7,8. However if disc 1 is rotated about axis Oz with an angular velocity of $\Omega$rad/sec it may be shown that inertia forces are generated in the disc producing a secondary dilatation $e_2$ which is coaxial with and geometrically similar to the primary dilatation $e_1$ but which is phase-displaced because it obeys the law $$e_2 = e_{02}(t) \sin 2\theta.$$

This secondary dilatation causes a voltage to be generated at the output of amplifier $A_2$ which is proportional to the rate of change of $e_{02}$ with respect to time. If the voltage applied to terminal $T_4$ is now provided by amplifier $A_2$, by way of a feedback unit 18, it may be shown that the output of amplifier $A_2$ can be maintained at a near-null value and that the voltage (V, as indicated by a display 18a forming part of unit 18) applied to terminal $T_4$ will provide a direct measure of the angular velocity $\Omega$.

Figure 4:
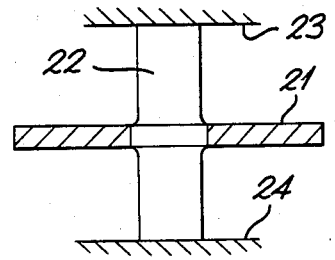
Figure 5:
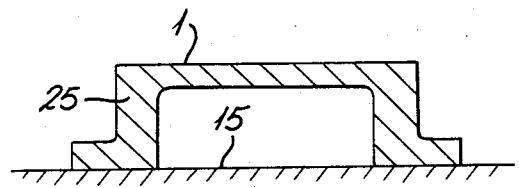

FIGS. 3 to 5 show variants of the arrangement of disc 1 and stem 2 shown in FIGS. 1 and 2. In FIG. 3, the disc 1 is supported by a very short stem 19 from a raised base 20. In FIG. 4, the disc is replaced by an annular sensitive element 21 formed around a column 22 anchored at opposite ends to fixed structures 23 and 24. In FIG. 5, the disc 1 is anchored to supporting structure 15 not by a central stem but by a cylindrical support 25 attached to the periphery of the disc.

Figure 6:
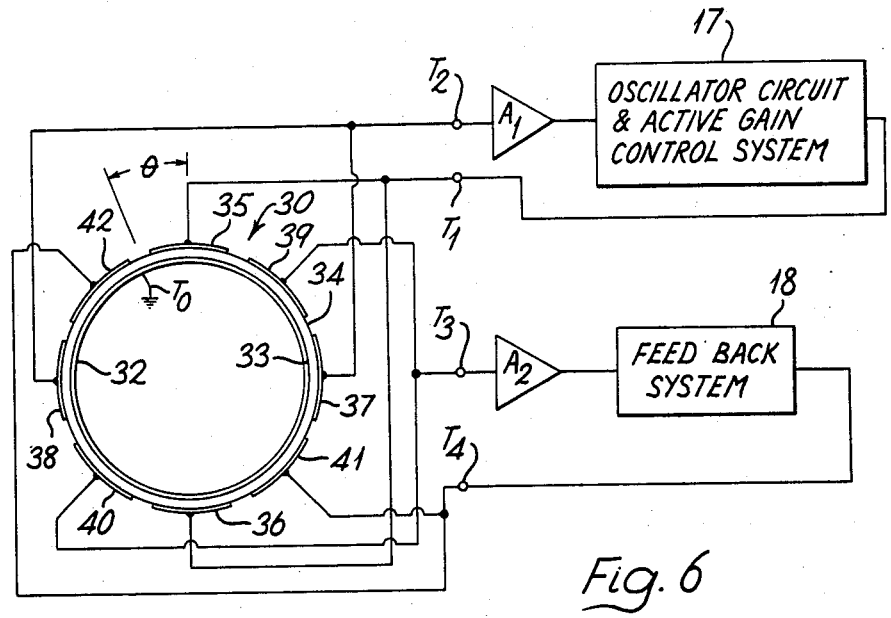
FIG. 6 is similar to FIG. 1 but shows a cylinder-type structure.
Figure 7:
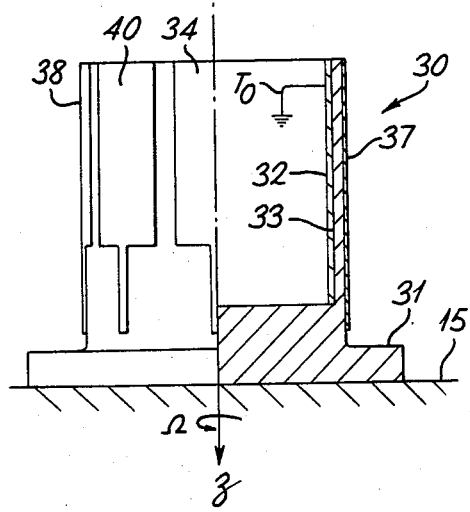
FIG. 7 shows the cylinder of FIG. 6 partly in section and partly in elevation.

Instead of the disc 1, the sensitive element of FIG. 6 is a thin-walled cylindrical shell 30 made from a radially polarized hexagonal ceramic piezo-electric material such as PZT. Shell 30 is free from constraint at its upper end but its lower end is fixed to a rigid flange 31 which is in turn anchored to fixed structure 15. As shown, shell 30 and flange 31 are integral, but alternatively they could be separate items bonded or otherwise joined together. A single electrode 32 is deposited on the inner surface 33 of shell 30: it covers the whole of that surface and is maintained at ground potential by way of terminal $T_0$.

Deposited on the outer surface 34 of the shell are eight identical and equispaced electrodes 35–42. Although these electrodes are not sector-shaped but are rectangular, with their longitudinal edges parallel to the axis Oz of shell 30, their arrangement and function is otherwise very similar to that of electrodes 5–12 in FIG. 1 and they are paired 35 with 36, 37 with 38, 39 with 40 and 41 with 42 to form terminals $T_1$, $T_2$, $T_3$ and $T_4$. When a voltage is applied to $T_1$ a radial electrical field analogous to the axial field of FIG. 1) is produced and a strain varying around the circumference of shell 30 is set up which obeys the law $e_1 = e_{01}(t) \cos 2\theta$ as before. Under the influence of this strain the cross-section of the shell repeatedly changes shape between two elliptical extreme positions in a manner analogous to that of the disc-like structures of FIGS. 1 to 5, the two ellipses being similar in shape but with their major axes at right angles to each other. Rotation of shell 30 about axis Oz with an angular velocity Ωrad/sec again generates inertia forces producing a secondary strain $e_2$ varying according to the law $e_2 = e_{02}(t) \sin 2\theta$, and once again the feedback unit 18 may operate to maintain the output of amplifier $A_2$ at a near-null value so that the voltage applied to terminal $T_4$ will provide a direct measure of angular velocity Ω.

Figure 8:
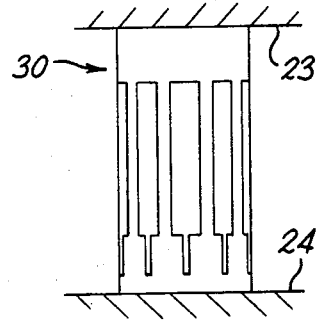
FIG. 8 shows an alternative cylinder mounting in elevation.
Figure 9A:
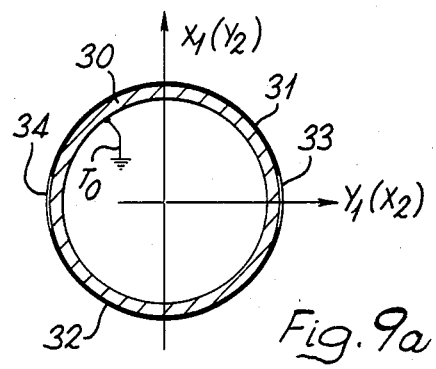
FIGS. 9a–9c comprises three views—transverse section, front elevation and side elevation—of an alternative cylinder.
Figure 9B:
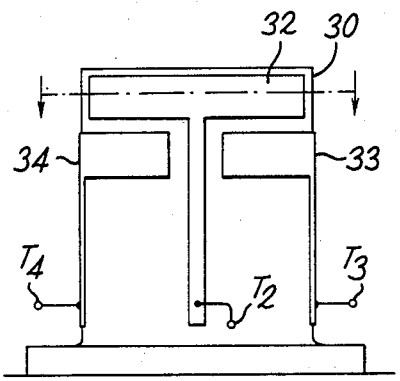
Figure 9C:
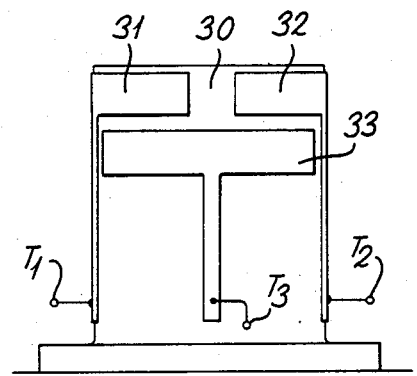

FIG. 8 shows a construction analogous to that of FIG. 4, in which the shell 30 carries electrodes disposed as in FIG. 6 but is anchored at both ends to fixed structures 23 and 24. FIGS. 9a–9e show the different electrode patterns that would be appropriate if the shell 30 were made from say quartz or lithium niobate, rather than PZT. For such materials only four electrodes 31–34 on the outer surface are required but they should be aligned with respect to the crystal axes as shown. Axes $OX_1Y_1$ would apply for quartz, and $OX_2Y_2$ for lithium niobate. Terminals $T_1$ to $T_4$ are connected to their respective amplifiers $A_1$ and $A_2$ and units 17 and 18 as described with reference to previous figures, and the voltage generated at $T_4$ may again provide a direct measure of the angular velocity Ω.

I claim:

1. A gyroscopic device comprising:
   a circular disc having first and second oppositely facing faces, and axis, and comprising an intergral mass of material having piezo-electric properties, said disc being adapted to be rotated about its axis at a rate of turn, said second face having an electrode;
   a plurality of first electrodes mounted in an axisymmetric formation on said disc first face;
   means for providing an AC voltage between said plurality of first electrodes and said electrode on said second face for causing, in conjunction with the piezo-electric properties of said disc, a pattern of strain to be generated within said disc, said pattern varying cyclically around said disc in a circumferential direction;
   a plurality of second electrodes axisymmetrically mounted on said disc first face and angularly displaced with respect to said plurality of first electrodes, said second electrodes emitting electrical signals which are generated by an interaction between said pattern of strain and the piezo-electric properties of said disc, said electrical signals varying when said disc is rotated about its axis due to an angular displacement of the cyclically varying strain pattern; and
   means for measuring said rate of turn from the variation of said electrical signals.

2. A gyroscopic device according to claim 1 in which said disc is anchored to ground by means of a support connecting said ground to a center of said disc.

3. A gyroscopic device according to claim 2 in which areas of ground lie adjacent to both faces of said disc, and in which separate supports extending away from said disc in opposite axial directions connect said disc to both of said areas of ground.

4. A device according to claim 1 wherein said second electrodes are mounted at locations coinciding, in the absence of any said rate of turn, with nodes of said pattern of strain generated by said first electrodes.

5. A device according to claim 1 wherein said electrodes are electro-deposited on said disc first face.

6. A gyroscopic device, comprising:
   a radially polarized hollow cylinder having an axis and comprising an intergral mass of material having piezo-electric properties, said cylinder having an inner wall, and outer wall, and a uniform cross-section along the entire length of said cylinder, said cylinder being adapted to be rotated about its ais at a rate of turn;
   a plurality of first electrodes mounted in an axisymmetric formation on one of said walls, and an electrode mounted on the other of said walls;
   means for providing an AC voltage between said plurality of first electrodes and said electrode on said other wall for causing, in conjunction with the piezo-electric properties of said cylinder, a pattern of strain to be generated within said cylinder, said pattern varying cyclically around said cylinder in a circumferential direction;
   a plurality of second electrodes axisymmetrically mounted on said one wall and angularly displaced with respect to said plurality of first electrodes, for emitting electrical signals which are generated by an interaction between said pattern of strain and the piezo-electric properties of said cylinder and which vary when said cylinder is rotated about its axis due to an angular displacement of the cyclically varying strain pattern; and
   means for measuring said rate of turn from the variation of said electrical signals.

7. A gyroscopic device according to claim 6 in which said second electrodes are mounted at locations coinciding, in the absence of any said rate of turn, with nodes of said pattern of cyclical strain generated by said first electrodes.

8. A gyroscopic device according to claim 6 in which areas of ground lie adjacent to both axial ends of said cylinder, and in which each said axial end of said cylinder is anchored to a respective adjacent area of ground.

9. A gyroscopic device according to claim 6 in which said electrodes are mounted on said cylinder by electro-deposition.

* * * * *